United States Patent
Duval et al.

(10) Patent No.: US 6,367,840 B1
(45) Date of Patent: Apr. 9, 2002

(54) MODULATABLE ENERGY ABSORPTION DEVICE FOR AUTOMOBILE VEHICLE STEERING COLUMNS WHICH USES PYROTECHNIC CHARGES

(75) Inventors: Benoît Duval; Abdel Karim Ben Rhouma, both of Vendome (FR)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 09/712,169

(22) Filed: Nov. 15, 2000

(30) Foreign Application Priority Data

Nov. 19, 1999 (FR) .............................. 99 14813

(51) Int. Cl.$^7$ ................................. B62D 1/11
(52) U.S. Cl. ......................... 280/777; 74/492
(58) Field of Search ............... 280/777, 775; 74/492, 493; 188/371, 374

(56) References Cited

U.S. PATENT DOCUMENTS

| | | | | |
|---|---|---|---|---|
| 5,609,364 A | * | 3/1997 | Fourquet et al. ............ | 280/777 |
| 5,720,496 A | * | 2/1998 | Riefe et al. ................. | 280/775 |
| 6,149,196 A | * | 11/2000 | Guiard et al. .............. | 280/777 |
| 6,170,874 B1 | * | 1/2001 | Fosse ......................... | 280/777 |
| 6,183,012 B1 | * | 2/2001 | Dufour et al. .............. | 280/777 |
| 6,189,919 B1 | * | 2/2001 | Sinnhuber et al. .......... | 280/731 |
| 6,227,571 B1 | * | 5/2001 | Sheng et al. ................ | 280/777 |
| 6,234,528 B1 | * | 5/2001 | Ben-Rhouma et al. ...... | 280/777 |

FOREIGN PATENT DOCUMENTS

| DE | 195 10615 A | 9/1996 |
|---|---|---|
| FR | 2 775 647 A | 9/1999 |

OTHER PUBLICATIONS

"Computer Controlled Energy Absorbing Steering Column for Automotive Use," Research Disclosure No. 359, Mar. 1994, pp. 157–159, XP000440547, Industrial Opportunities Ltd., Havant., GB.

* cited by examiner

Primary Examiner—J. J. Swann
Assistant Examiner—David R. Dunn
(74) Attorney, Agent, or Firm—Lawrence E. Laubscher, Sr.

(57) ABSTRACT

A modulatable energy absorption device for an automobile vehicle steering column includes a number of coils of particular section, a mobile support guided by a fixed support fastened to the vehicle and locked to the fixed support with a particular clamping force, the coils being each connected to a retaining pin and to an attachment pin consisting of a fixed holding rod and two mobile holding rods moved along their axis by a pyrotechnic actuator so as to uncoil one or more coils in the event of an impact.

27 Claims, 13 Drawing Sheets

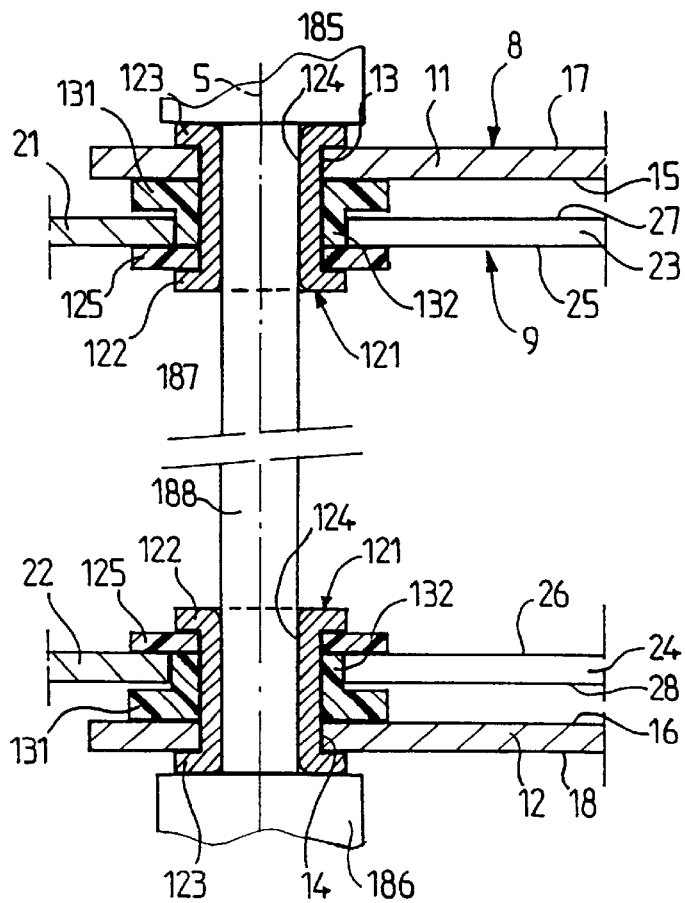
FIG.11
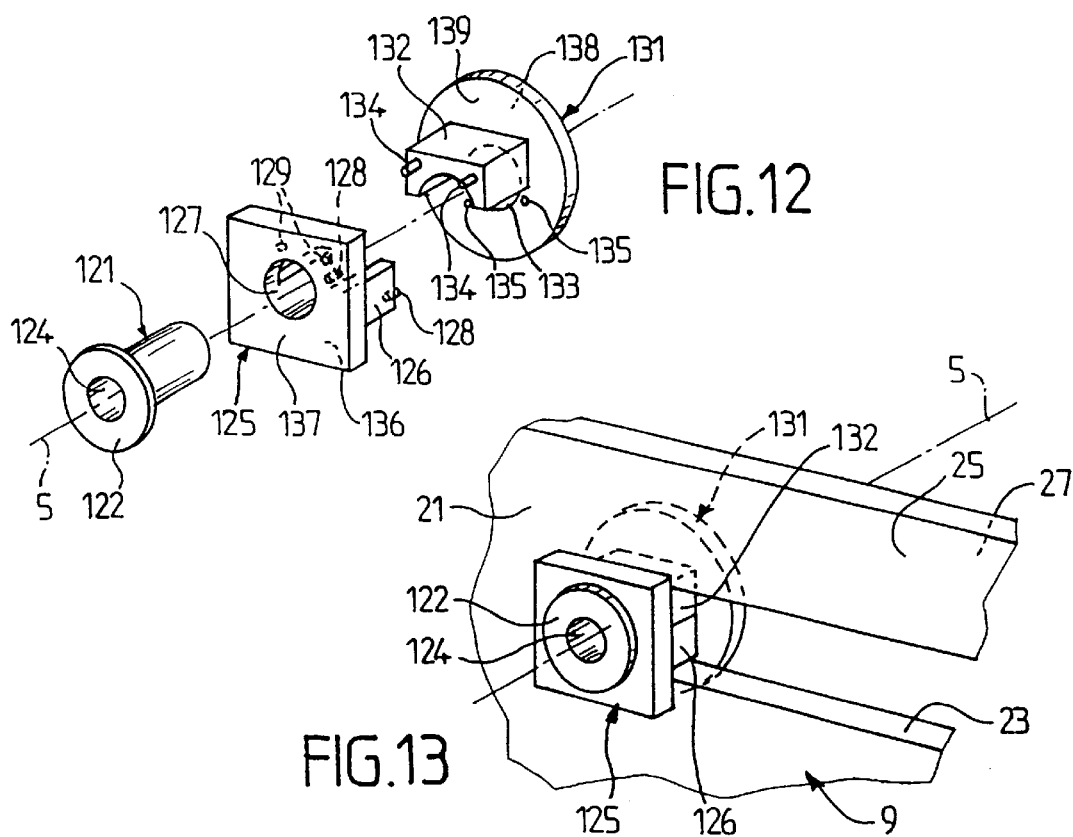
FIG.12
FIG.13

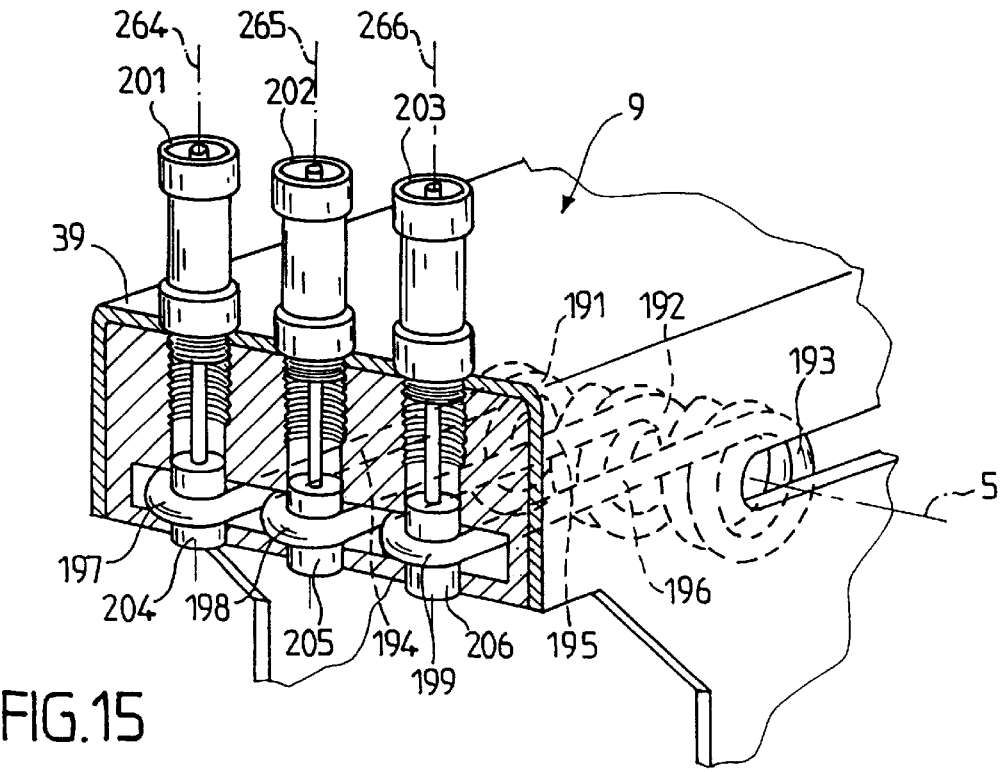
FIG.15
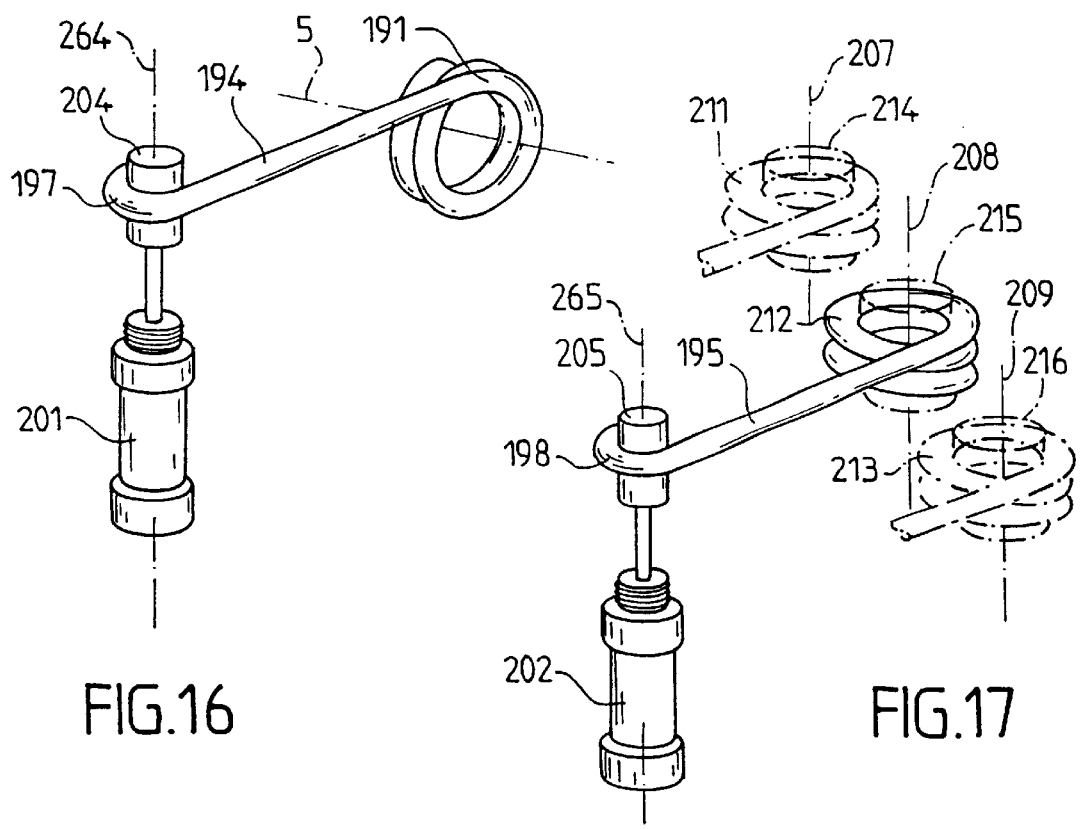
FIG.16
FIG.17

MODULATABLE ENERGY ABSORPTION DEVICE FOR AUTOMOBILE VEHICLE STEERING COLUMNS WHICH USES PYROTECHNIC CHARGES

BACKGROUND OF THE INVENTION

1—Field of the Invention

The present invention relates to a modulatable energy absorption device for automobile vehicle steering columns which uses pyrotechnic charges.

The device in accordance with the invention applies in particular to a steering column whose depth and/or inclination is adjustable, whose steering shaft is mounted in a body-tube, which is supported by and locked to the vehicle in the required position. The invention can also apply to a non-adjustable steering column.

2—Description of the Prior Art

The increasing improvement of the safety of steering columns requires manufacturers to control all the parameters of the energy absorbing systems. Thus, in the case of the method of absorbing energy by uncoiling a wire, which is increasingly used on steering columns, consideration has been given to modulating the absorption of energy as a function of characteristics of the driver, such as in particular their weight and whether or not their seat belt is fastened and as a function of the speed of the vehicle.

OBJECT OF THE INVENTION

An object of the present invention is to propose a modulatable energy absorbing device which uses coiled wires of simple shapes which are easy to make but can absorb exactly the amount of energy to be dissipated as a function of characteristics of the driver and the vehicle and which mounts easily within the overall dimensions of existing steering columns.

SUMMARY OF THE INVENTION

One embodiment of the invention relates to a modulatable device for absorbing energy from an automobile vehicle steering column, which includes a steering shaft rotatably mounted in a body-tube connected to a support assembly fixed to the vehicle, characterized in that said modulatable energy absorbing system includes:

a fixed support fastened to the vehicle and a mobile support which is connected to and locked to the fixed support with a particular clamping force such that said locking ceases in the event of an impact; and at least two coils of a metal member with a particular section, which are connected to the fixed support and to the mobile support by a retaining pin and by an attachment pin, respectively;

the coils being mounted on one or more rollers disposed on the retaining pin fastened to the fixed support member and each having a rectilinear portion in substantially the same direction as the force to be damped, and a free end which is attached to the corresponding attachment pin disposed at one end of the mobile support, at the same end as the steering rack, i.e. at the opposite end to the steering wheel, and at least one coil having its attachment pin or its retaining pin in the form of a holding rod adapted to be moved along its axis by pyrotechnic displacement means which are actuated by actuator means, so that in the event of an impact the mobile support is connected to the fixed support by a number of coils suitable for the energy to be absorbed.

In the event of an impact, the above arrangement connects the mobile support to the fixed support by means of a required number of coils, determined according to the weight of the driver, whether or not the driver's seat belt is fastened, and the speed of the vehicle.

Accordingly the mobile support, which is connected to the body-tube and therefore to the steering wheel, pulls on the free end of the coil(s) attached to the corresponding attachment pin so that the coil(s) concerned are uncoiled to absorb the energy to be dissipated.

In different architectures in accordance with the invention, for attaching or for retaining the coils, at least one coil has a movable holding rod that is substantially horizontal or vertical.

In accordance with the invention, three coils are advantageously mounted on a roller disposed around a retaining pin and are attached to movable holding rods having corresponding pyrotechnic actuators which are substantially vertical.

In another embodiment of the invention, three coils are mounted on a roller disposed around a retaining pin, one of them is attached to a fixed holding rod supported by two bearings, and the other two are attached to corresponding movable holding rods supported by two bearings and each having a pyrotechnic actuator.

In another embodiment of the invention, three coils are each mounted on a corresponding roller disposed around a retaining pin, one of them is attached to a fixed holding rod supported by two bearings, and the other two are each attached to corresponding movable holding rods supported by two bearings and each having a pyrotechnic actuator.

In this embodiment of the invention, the coil attached to a fixed holding rod is the central coil.

In accordance with another embodiment of the invention, three coils are each mounted on a corresponding roller disposed around a corresponding substantially vertical retaining pin, the central coil being retained by a fixed holding rod supported by two central bearings, and each lateral coil being retained by a movable holding rod supported by two corresponding lateral bearings, and having a corresponding pyrotechnic actuator, the three coils being attached to a single attachment pin consisting of a fixed holding rod supported by two central bearings and two lateral bearings.

In one type of detailed structure of the invention:

the fixed support includes a base with two substantially vertical lugs between which the mobile support is engaged, each of the lugs having a hole in it through which the retaining pin passes;

the mobile support has two substantially vertical lateral parts and a connecting portion; and each of the lateral parts has an oblong hole in its upper part through which the retaining pin passes and the oblong hole has a length corresponding to the energy absorption travel.

In this type of structure, the retaining pin is a rod with a sleeve, said sleeve is disposed between the two lateral parts of the mobile support, said rod is held at each of its two ends by a fixing assembly in the corresponding lug of the fixed support and by a sliding assembly of the mobile support; each fixing assembly is locked onto each of the lugs with a particular force.

Each fixing assembly includes a clamping washer disposed between the sleeve and the corresponding lug of the fixed support, said clamping washer including a tube passing through the oblong hole in the corresponding lateral part of the mobile support and a corresponding threaded end of the rod passes through the tube of the clamping washer and the hole through the corresponding lug to receive a clamping nut, which is applied to said lug in order to lock the fixing assembly at a particular value.

Each sliding assembly includes an external washer with a square protuberance and an internal washer with a square hole which receives said square protuberance;

said square protuberance has a hole in it through which the tube of the clamping washer passes;

the external washer is disposed between the corresponding lug of the fixed support and the corresponding lateral part of the support;

the internal washer is disposed between said lateral part and the clamping washer;

the square protuberance passes through and slides in the corresponding oblong hole of the mobile support.

In another embodiment, the rod has one of its two ends threaded and the other end consists of a head applied to the corresponding lug of the fixed support.

In this first type of structure, the attachment pin consists of the central fixed holding rod and the two lateral movable holding rods, each of which has a pyrotechnic actuator, which is disposed on and fixed to the corresponding external bearing face of the mobile support; the lateral mobile holding rods pass through a corresponding hole in each of the lateral parts of the mobile support, and are supported by corresponding bearings which are part of a bracket mounted on and fixed to the connecting portion of the end of the mobile support; the central fixed holding rod is supported by the two bearings; a closure member of the bracket surrounds the end of the mobile support, the bracket and the free ends of the coils, said closure member being assembled to the mobile support and the bracket.

A second type of detailed structure of the invention includes:

a retaining pin consisting of a central fixed holding rod and two lateral movable holding rods, each of which has a pyrotechnic actuator; and two rollers mounted on a thin tube in which the lateral movable holding rods slide, and a roller mounted on the central fixed holding rod, which is mounted on the thin tube.

In this second type of structure, each of the two lateral movable holding rods has a pyrotechnic actuator disposed on and fixed to the external face of the corresponding lug of the fixed support; the retaining pin has at each end a fixing assembly in the corresponding lug of the fixed support and a sliding assembly of the corresponding lateral part of the mobile support; each fixing assembly is locked to each of the lugs with a particular clamping force; each of the movable lateral holding rods passes through or engages in the corresponding fixing assembly.

Each fixing assembly includes a metal tube which passes through the oblong hole in the corresponding lateral part of the mobile support and which passes through the hole through the corresponding lug; an internal taper is provided at the same end as said lateral part and an external taper is provided at the same end as said lug in order to lock the fixing assembly.

Each sliding assembly includes an external washer with a square half-protuberance and a hole through it, and an internal washer with a square half-protuberance and a hole through it, each half-protuberance nesting in the other washer by means of tenons entering the holes to form a square protuberance; the external washer is disposed between the corresponding lug of the fixed support and the corresponding lateral part of the mobile support; the internal washer is disposed between said lateral part and the internal taper of the metal tube; the square protuberance passes through and slides in the corresponding oblong hole in the lateral part of the mobile support.

Moreover, the tube is supported by four bearings which form part of a bracket mounted on and fixed under the base of the fixed support.

In the second type of structure, the attachment pin includes three semi-circular notches at the edge of the connecting portion which forms part of the end of the mobile support; each notch receiving the free end of one of the aforementioned coils.

The modulatable energy absorbing device in accordance with the invention has the advantage of having a structure that is simple to construct, with guaranteed quality in mass production, as is the case in the automobile industry. Moreover, the device is easy to mount within the overall dimensions of existing steering columns. Finally, the modulatable energy absorbing device matches the energy absorbed exactly to what is required, allowing in particular for the weight of the conductor, whether or not the seat belt is being worn and the speed of the vehicle, all this in combination with the same uncoiling travel.

BRIEF DESCRIPTION OF THE DRAWINGS

Other features and advantages of the present invention will become more clearly apparent on reading the following description of several preferred embodiments of the invention, which description is given with reference to the corresponding accompanying drawings, in which:

FIG. 3 is a view in section in the plane passing through the retaining and attachment pins;

FIG. 4 is a view in section taken along the line IV—IV in FIG. 3;

FIG. 11 is a partial section to a larger scale of FIG. 9 and relates to the retaining pin;

FIG. 12 is an exploded perspective view corresponding to FIG. 11;

FIG. 13 is a perspective view corresponding to FIG. 11;

FIG. 15 is a perspective view partly in cross section of another embodiment of the retention and attachment of the coils;

FIG. 16 is a perspective view of another embodiment of the retention and the attachment;

FIG. 17 is a perspective view of another embodiment of the retention and the attachment;

DESCRIPTION OF THE PREFERRED EMBODIMENTS

Figure 1:
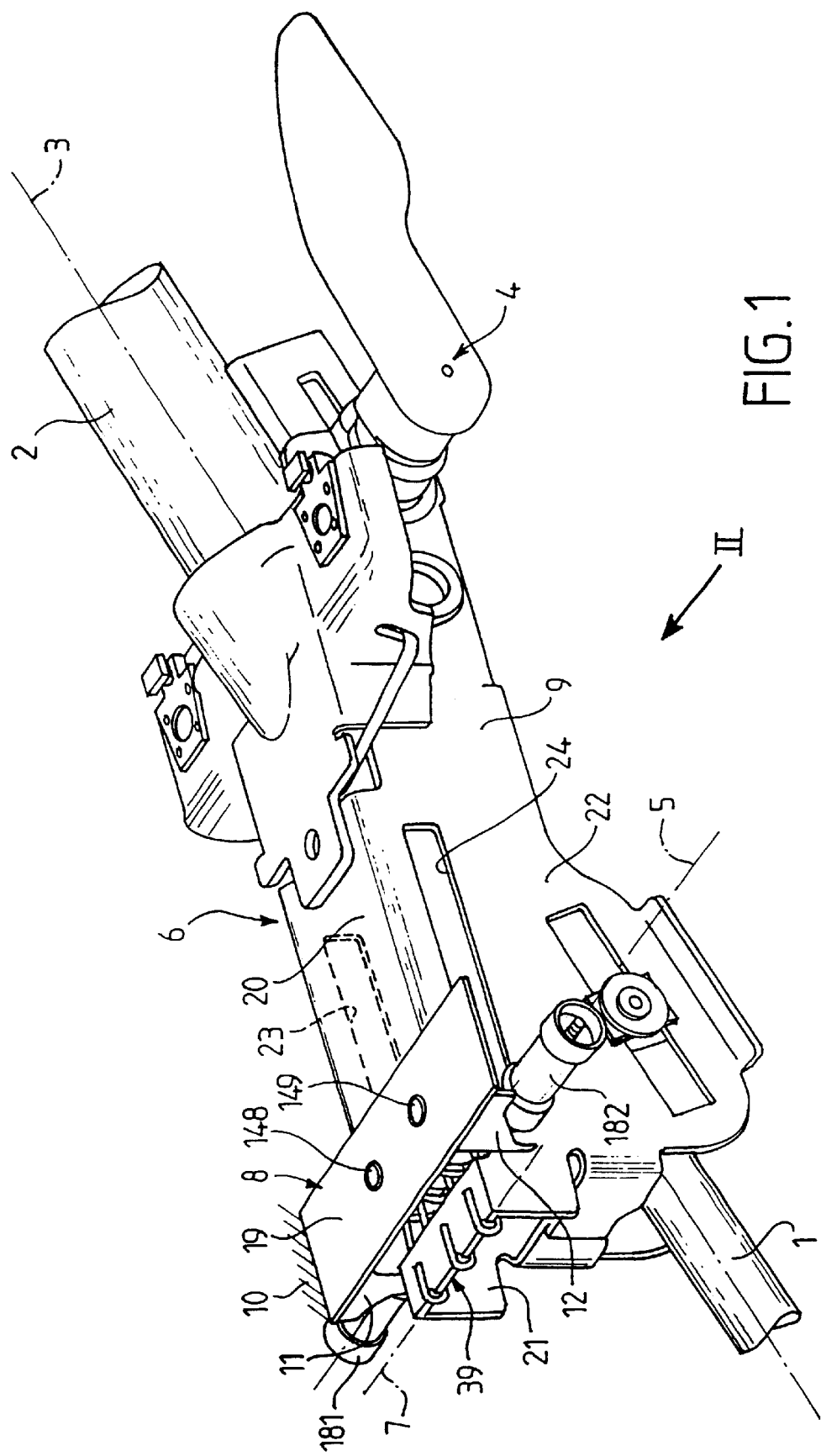
FIG. 1 is a perspective view from above of an automobile vehicle steering column which is equipped with a modulatable energy absorbing device in accordance with the invention.
Figure 2:
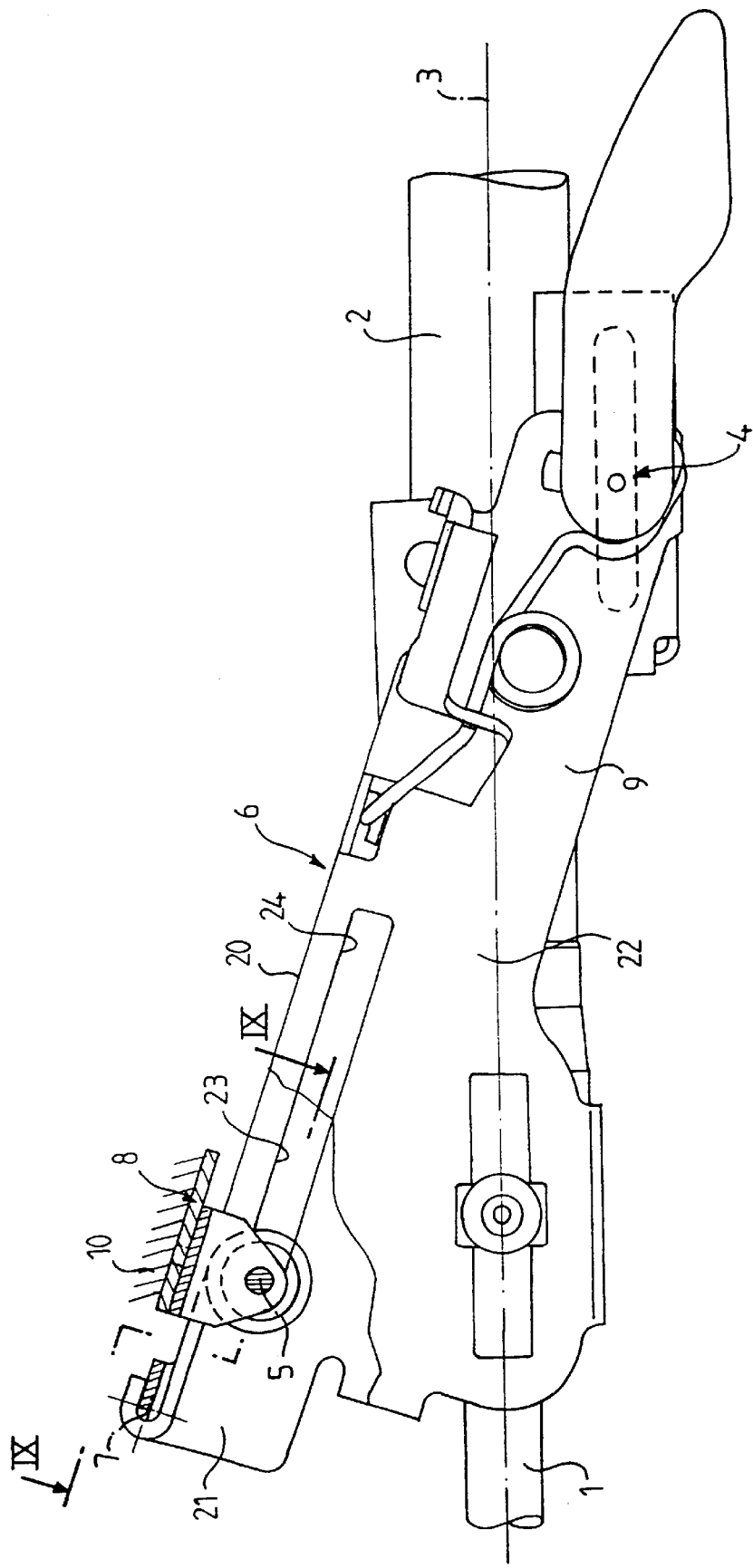
FIG. 2 is a view in the direction of the arrow II in FIG. 1.

As can be seen in FIGS. 1, 2, 3 and 9, an automobile vehicle steering column includes a steering shaft 1 which is rotatably mounted in a body-tube 2 around a steering axis 3. The body-tube 2 is connected to a support assembly 6 by a system 4 for adjusting its depth and/or inclination. The invention can also apply to a non-adjustable steering column, in which case the body-tube 2 is connected directly to the support assembly 6.

The support assembly 6 includes a fixed support 8 and a mobile support 9. The fixed support 8 is fastened to the bodyshell 10 of the vehicle or to a bodyshell member. The mobile support 9 is connected to the body-tube 2 by the adjustment system. The mobile support 9 is connected to the fixed support 8 and is locked to said fixed support with a particular clamping force, which enables the mobile support 9 to slide inside the fixed support 8 for absorbing the energy of a shock.

The fixed support 8 includes a base 19 with two substantially vertical lugs 11 and 12 which are connected to the base 19. Each of the lugs 11 and 12 has a hole 13, 14 in it through which passes the retaining pin 5 of the mobile support 9. The lugs 11 and 12 are substantially vertical and parallel to the steering axis 3.

The mobile support 9 has two substantially vertical lateral parts 21 and 22 and a connecting part 20. The two lateral parts 21 and 22 of the mobile support 9, which are substantially parallel to the steering axis 3, engage between the two lugs 11 and 12 of the fixed support 8.

Each of the lateral parts 21 and 22 has an oblong hole 23, 24 in its upper part through which the retaining pin of the mobile support 9 passes.

The length of each of the oblong holes 23 and 24 corresponds to the energy recovery travel.

Each of the lateral parts 21 and 22 has a hole in its lower part through which the pin of the adjustment system 4 passes.

In the remainder of the description, and in respect of the same member, the term "internal" relative to the steering axis 3 means nearer the steering axis 3 and the term "external" means farther from it. Thus the lug 11 of the fixed support 8 has an internal face 15 and an external face 17 referred to the steering axis 3. Similarly, the lug 12 has an internal face 16 and an external face 18 referred to the same steering axis 3.

In the same manner for the mobile support 9, the lateral portion 21 has an internal face 25 and an external face 27 and the lateral portion 22 has an internal face 26 and an external face 28.

As can be seen in FIGS. 1, 2, 3 and 9, the modulatable energy absorbing device in accordance with the invention includes:

at least one retaining pin 5, at least one attachment pin 7, and a plurality of coils connected to the retaining and attachment pins 5, 7.

Figures 3, 4:
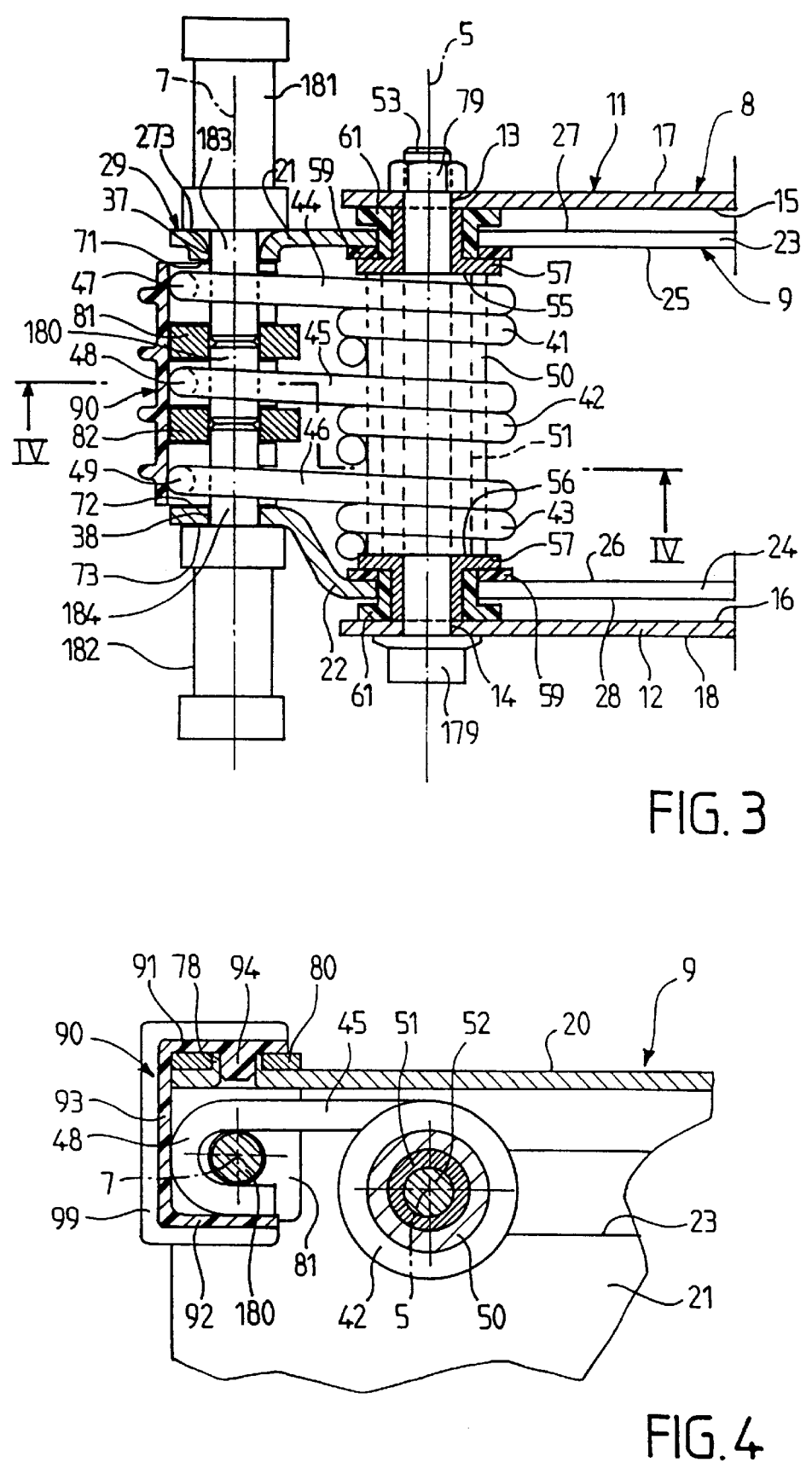

The retaining pin 5 is substantially perpendicular to the steering axis 3 of the column and to the lugs 11 and 12 of the fixed support 8 and is carried by said lugs 11 and 12. The attachment pin 7 is substantially perpendicular to the steering axis 3 of the column and to the lateral parts 21 and 22 of the mobile support 9 and is carried by the mobile support 9. The coils are formed from a metal member with a particular section, for example round or square. In FIG. 3, the coils 41, 42 and 43 are mounted on a roller 50 which is disposed on the corresponding retaining pin 5 fastened to the fixed support member 8.

The coils 41, 42, 43 each have a free end 47, 48 and 49 which is attached to the attachment pin 7 disposed at one end 29 of the mobile support 9. The corresponding end 29 of the mobile support 9 is at the same end as the steering rack, i.e. at the opposite end to the steering wheel.

According to one essential feature of the invention, the attachment pin 7 of at least one coil consists of a movable holding rod 183, 184, as shown in the figure. The holding rods can be moved along their axis by pyrotechnic displacement means 181, 182 which are actuated by actuator means.

Accordingly, in accordance with the invention, in the event of an impact, the attachment pin 7 can be connected to the retaining pin 5 by a required number of coils, which number is determined as a function of characteristics of the driver, and in particular the driver's weight and whether or not the seat belt is fastened, and as a function of the speed of the vehicle. In this way, in the event of an impact, the support 9 which is connected to the body-tube 2 and therefore to the steering wheel pulls on the free end of the coils, which is attached to the attachment pin 7, to uncoil the coil(s) and absorb the energy to be dissipated.

FIGS. 3, 4, 5, 6, 7 and 8 show a first detailed embodiment of the invention. In this first type of structure of the invention the attachment pin 7 of the corresponding coils is disposed at the end 29 of the mobile support 9 and consists of a central fixed holding rod 180 and two lateral movable holding rods 183 and 184 each of which has a pyrotechnic actuator 181, 182.

Three coils 41, 42 and 43 are mounted on a roller 50 disposed on a sleeve 51 around the retaining pin 5. Each coil 41, 42 and 43 has a rectilinear portion 44, 45 and 46 in substantially the same direction as the force to be damped. Each rectilinear portion 44, 45 and 46 is extended by a free end 47, 48, 49 which is curved around the holding rod 31.

The retaining pin 5 consists of a rod 52 which passes through the fixed support 8 and the mobile support 9. The rod 52 carries a sleeve 51 which is disposed between the respective internal faces 25 and 26 of the two lateral parts 21 and 22 of the mobile support 9. The rod 52 is held at each of its two ends 53 and 54 by a fixing assembly which is mounted on the corresponding lug 11 and 12 of the fixed support 8. A sliding assembly of the mobile support 9 in the fixing assembly is also provided. Each fixing assembly is locked to each of the lugs 11 and 12 with a particular clamping force.

Figure 5:
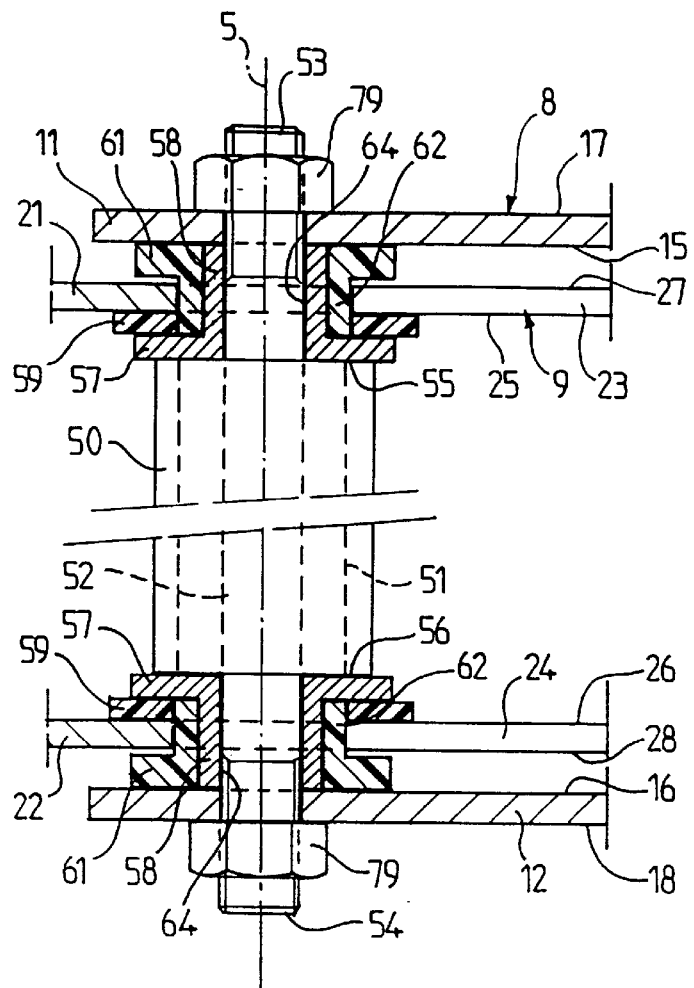
FIG. 5 is a partial section to a larger scale of FIG. 3 and relates to the retaining pin.
Figure 6:
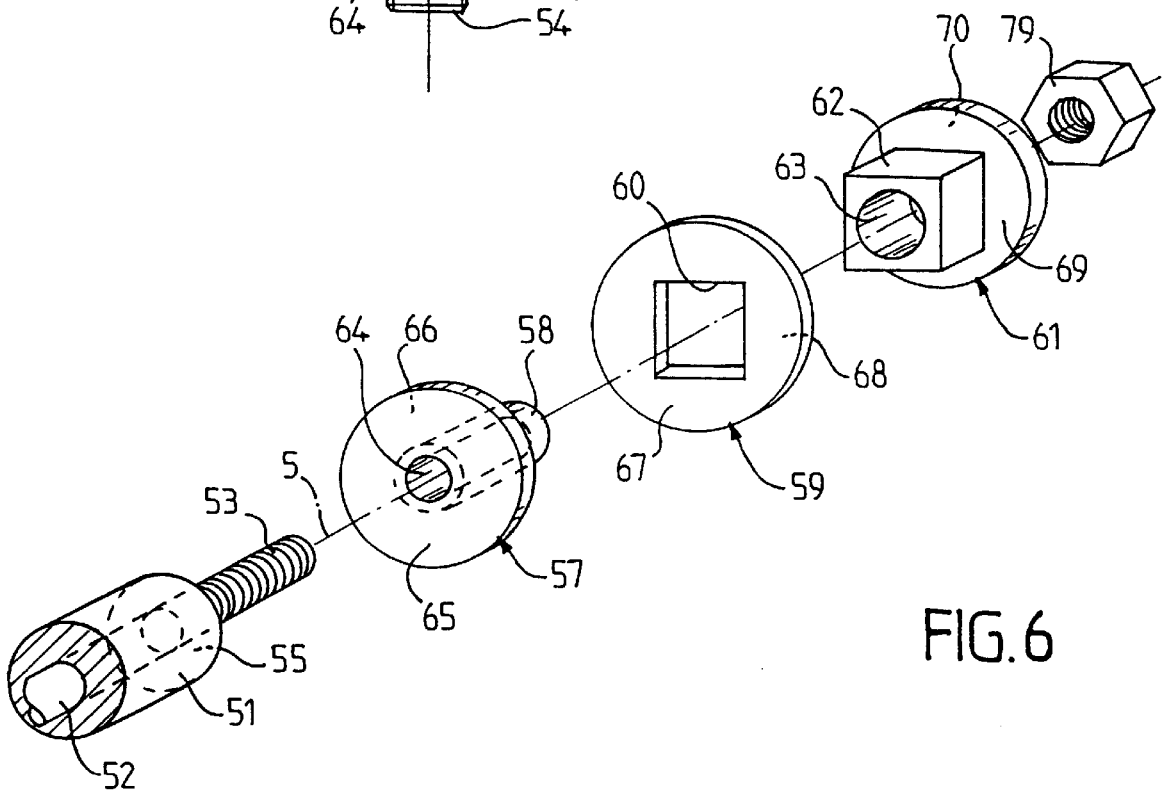
FIG. 6 is an exploded perspective view corresponding to FIG. 5.

As can be seen more precisely in FIGS. 5 and 6, each fixing assembly disposed at the end of the rod 52 includes a clamping washer 57. The internal face 65 of the clamping washer 57 is disposed between the bearing face 55 or 56 of the sleeve 51 and the corresponding internal face 15 and 16 of the lugs 11 and 12 of the fixed support 8. The clamping washer 57 includes a tube 58 which passes through the oblong hole 23, 24 in the corresponding lateral part 21, 22 of the mobile support 9. The rod 52 has two threaded ends 53 and 54 which pass through the holes 64 in the tubes 58 of the clamping washers 57. Each threaded end 53, 54 passes through the hole 13, 14 in the corresponding lug 11, 12 to receive a clamping nut 79 which is applied to the corresponding external face 17, 18 of the lugs 11 and 12 to lock the fixing assembly with a particular force.

Each sliding assembly includes an external washer 61 with an internal face 69 and an external face 70 and an internal washer 59 with an internal face 67 and an external face 68. The external washer 61 has a square protuberance 62 and the internal washer 59 has a square hole 60 adapted to receive said square protuberance 62. Moreover, the square protuberance 62 includes a hole 63 through which the tube 58 of the clamping washer 57 passes. The external washer 61 is disposed between the corresponding internal face 16, 18 of the corresponding lug 11, 12 of the support 8 and the corresponding external face 27, 28 of the corresponding lateral part 21, 22 of the mobile support 9. The internal washer 59 is disposed between the corresponding internal face 25, 26 of the lateral portion 21, 22 and the external face 66 of the clamping washer 57. The square protuberance 62 passes through and slides in the corresponding oblong hole 23, 24 in the mobile support 9.

In a different embodiment, the rod 52 has one end 53 threaded and the other end consists of a head 179 applied to the corresponding lug 12 of the fixed support 8, as shown in FIG. 3.

The attachment pin 7 consists of the central fixed holding rod 180 and the two lateral mobile holding rods 183, 184 with a corresponding pyrotechnic actuator 181, 182. Each actuator 181, 182 is disposed on and fixed to a corresponding external bearing face 73, 273 of the mobile support 9. The lateral mobile holding rods 183, 184 pass through a corresponding hole 37, 38 through each of the lateral parts 21, 22 of the mobile support 9. Each lateral mobile holding rod 183, 184 is supported by a corresponding bearing 81 and 82 which is part of a bracket 80. The bracket 80 is mounted on and fixed to the connecting portion 20 of the end 29 of the mobile support 9. The central fixing holding rod 180 is supported by the two bearings 81 and 82.

Moreover, a closure member 90 of the bracket 80 surrounds the assembly formed by the end 29 of the mobile support 9, the bracket 80 and the free ends 47, 48 and 49 of the coils 41, 42 and 43. The closure member 90 is assembled to the mobile support 9 and the bracket 80.

Figure 7:
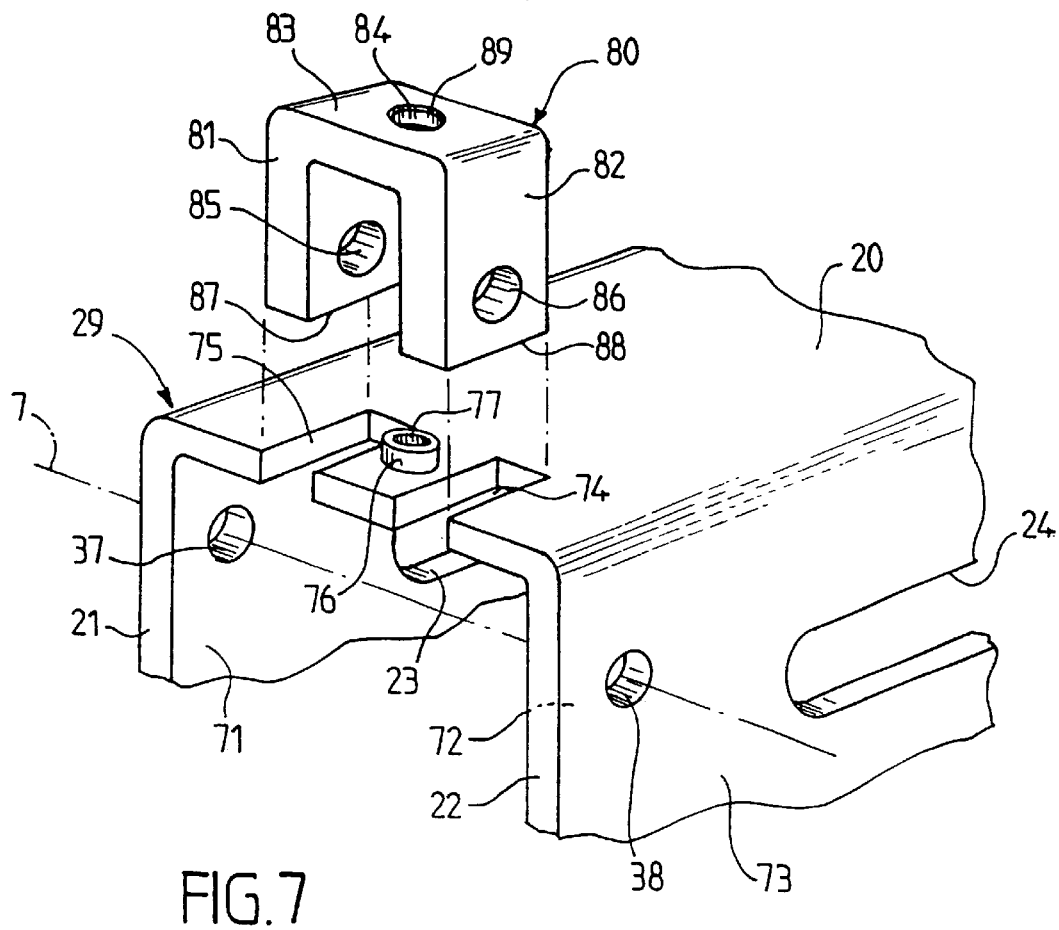
FIG. 7 is an exploded perspective view corresponding to FIG. 4.
Figure 8:
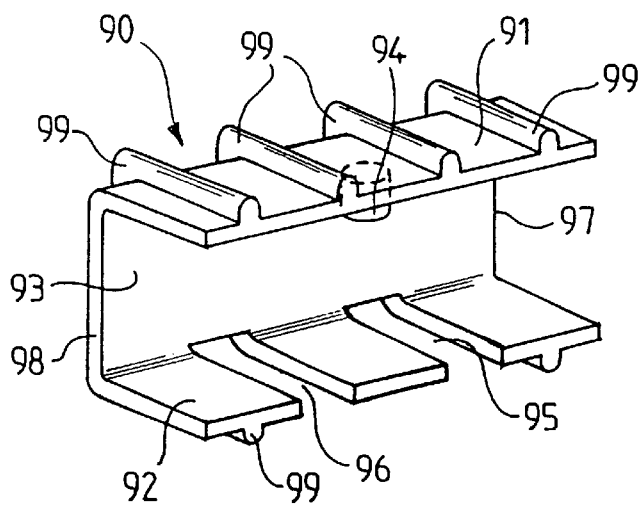
FIG. 8 is a perspective view of a member from FIG. 4.
Figure 9:
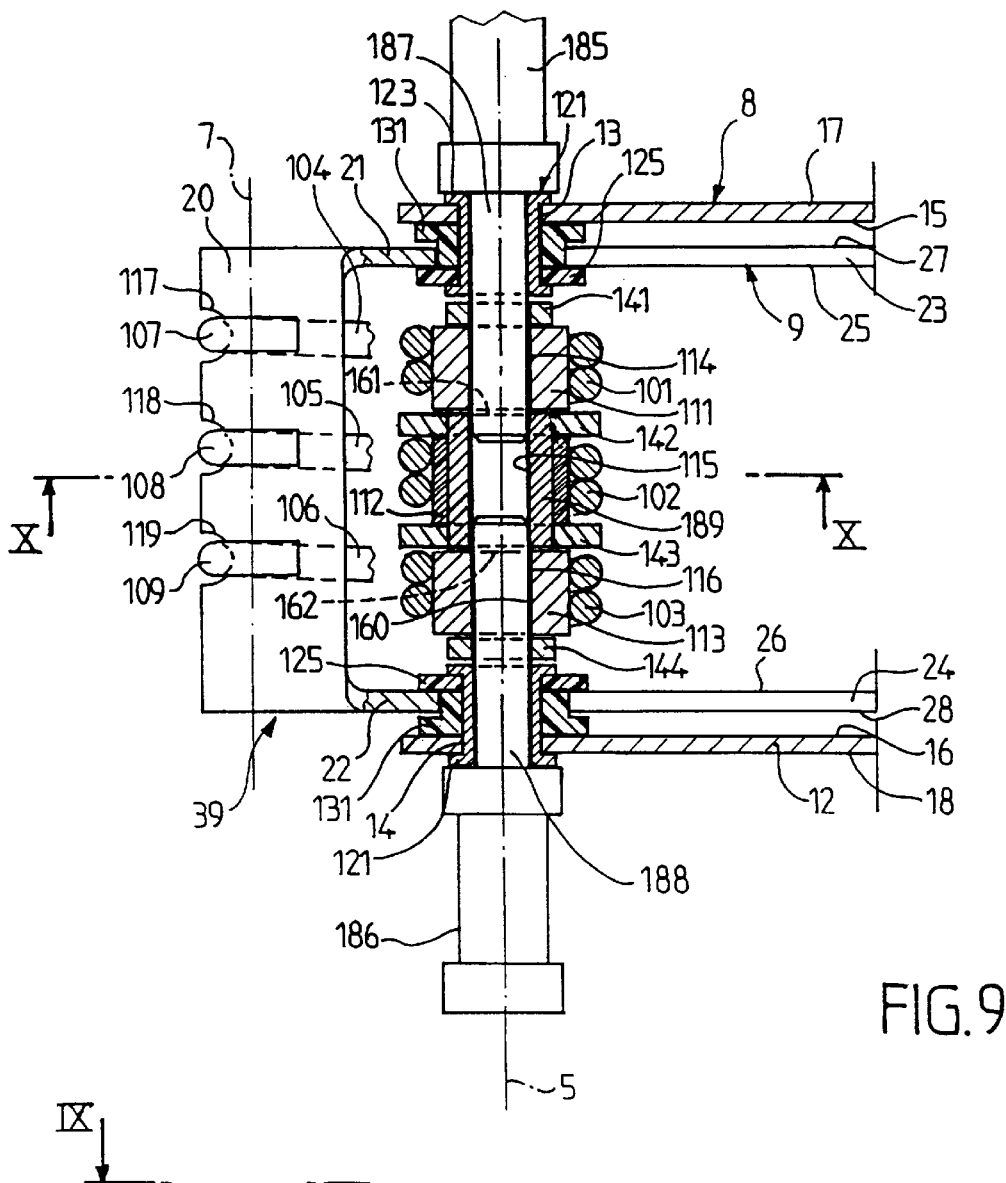
FIG. 9 is a view of another embodiment of the invention in section taken along the line IX—IX in FIG. 2.
Figure 10:
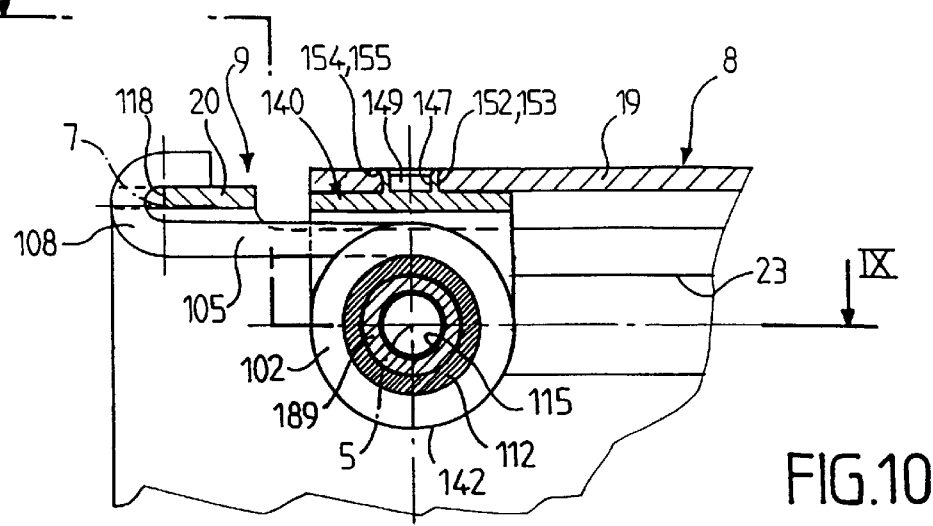
FIG. 10 is a view in section taken along the line X—X in FIG. 9.

FIGS. 7 and 8 show the arrangement of the bracket 80 and the closure member 90 in more detail. The end 29 of the mobile support member 9 includes two open notches 74 and 75 and a tenon 76 with a hole 77. The bracket 80 includes a base 83 with a bearing 81, 82 at each end. Each bearing 81, 82 has a hole 85, 86 through which the holding rod 31 passes and by which the rod is supported. The base 83 has a tapered hole 84 in it through which the tenon 76 passes. The bearings 81 and 82 engage in the open notches 74 and 75 and the end of the tenon 76 is bent over the taper 89 of the hole 84 to obtain a taper 78.

The closure member 90 includes two substantially parallel flanges 91 and 92 which are joined by a base 93, with stiffener gussets 99 on the outsides of the two flanges 91 and 92 and the base 93. Two open notches 95 and 96 are provided on the flange 92 and the bottom 93. The flange 91 has a tenon 94 which engages in the hole 77 in the tenon 76 and the ends 87 and 88 of the bearings 81 and 82 enter the open notches 95 and 96. The lateral faces 97 and 98 of the closure member 90 respectively slide between the internal bearing faces 71 and 72 of the end 29 of the mobile bearing member 9.

FIGS. 9, 10, 11, 12, 13 and 14 show a second embodiment of the invention. In the second type of structure of the invention the retaining pin 5 consists of a fixed holding rod 189 and two lateral mobile holding rods 187 and 188 each of which has a pyrotechnic actuator 185, 186 disposed in the fixed support 8. The attachment pin 7 is disposed at the end 39 of the mobile support 9.

The fixed support has holes 13, 14 in it through which the retaining pin 5 passes, and the retaining pin is disposed on the lugs 11 and 12 fastened to the base 19 of the fixed support 8. The mobile support 9 has lateral parts 21 and 22 and a connecting part 20. Each of the lateral parts 21, 22 has an oblong hole 25, 26 in its upper part through which the retaining pin 5 passes and whose length corresponds to the energy recovery travel. Three coils 101, 102 and 103 are each mounted on a roller 111, 112, 113. The two rollers 111 and 113 are mounted on a thin tube 160 in which the lateral mobile holding rods 187 and 188 slide. The roller 112 is mounted on the central fixed holding rod 189, which is disposed on the thin tube 160. Each of the coils 101, 102 and 103 has a respective rectilinear portion 104, 105 and 106 in substantially the same direction as the force to be damped and is extended by a free end 107, 108, 109 curved around the attachment pin 7. The two rollers 111 and 113 each include a hole 114, 116 and are mounted on the thin tube 160, in which the lateral mobile holding rods 187 and 188 slide.

The retaining pin 5 consists of the thin tube 160, the central fixed holding rod 189 and each of the two lateral mobile holding rods 187 and 188 with its pyrotechnic actuator 185, 186. Each pyrotechnic actuator 185, 186 is disposed on and fixed to the external face 17, 18 of the corresponding lug 11, 12 of the fixed support 8. The retaining pin 5 has at each of its two ends a fixing assembly which is disposed in the corresponding lug 11, 12 of the fixed support member 8. Moreover, a sliding assembly of the corresponding lateral part 21, 22 of the support 9 is provided in each of these fixing assemblies. Each fixing assembly is locked to each of the lugs 11 and 12 with a particular force. Moreover, the lateral mobile holding rod 187, 188 passes through or engages in the corresponding fixing assembly.

As can be seen more precisely in FIGS. 11, 12, 13 and 14, each fixing assembly includes a metal tube 121 which passes through the oblong hole 23 and 24 in the corresponding lateral part 21 and 22 of the mobile support 9. Moreover, the metal tube 121 passes through the hole 13, 14 in the corresponding lug 11, 12 of the fixed support 8. An internal taper 122 is provided at the same end as the corresponding lateral portion 21, 22 and an outside taper 123 is provided at the same end as the corresponding lug 11, 12 to lock the fixing assembly. Finally, the metal tube 121 has a hole 124 in it through which the holding rod 32 passes.

Each sliding assembly includes an external washer 131 with an internal face 139 and an external face 138 and an internal washer 125 with an internal face 137 and an external face 136. The external washer 131 has a square half-protuberance 132 and a hole 133 through it. The internal washer 125 has a square half-protuberance 126 and a hole 127 through it. Each half-protuberance 126, 132 respectively nests in the other washer 131, 125 by means of tenons 128, 134 which enter the holes 129, 135 to form a square protuberance.

The external washer 131 is disposed between the corresponding lug 11, 12 of the fixed support 8 and the corresponding lateral part 21, 22 of the mobile support 9. The internal washer 125 is disposed between the corresponding lateral part 21, 22 and the internal taper 122 of the metal tube 121. The square protuberance passes through and slides in the corresponding oblong hole 23, 24 of the lateral portion 21, 22 of the mobile support 9.

The thin tube 160, the central fixed holding rod 189 and the lateral mobile holding rods 187 and 188 are supported by four bearings 141, 142, 143 and 144 which are part of a bracket 140. The bracket 140 is mounted on and fixed under the base 19 of the fixed support 8.

Figure 14:
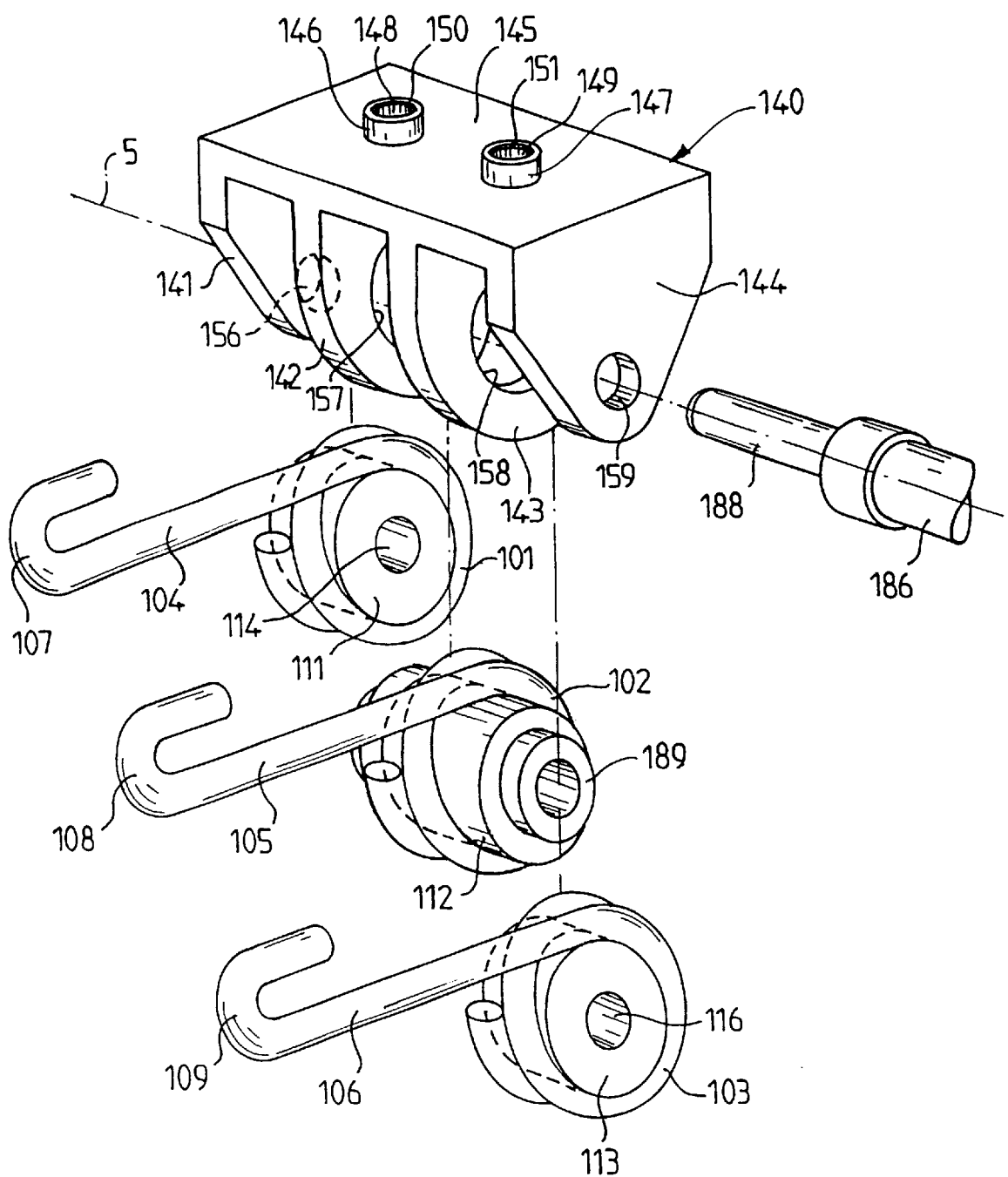
FIG. 14 is an exploded perspective view of FIGS. 9 and 10.

FIG. 14 shows in detail the mounting of the bracket 140 with the thin tube 160 on the fixed support 8.

The base 19 of the fixed support 8 includes two tapered holes 152 and 153 with a taper 154 and 155.

The bracket 140 includes a base 145 with four bearings 141, 142, 143 and 144. Each of the bearings has a hole 156, 157, 158 and 159 for mounting the thin tube 160, which has cut-outs 161 and 162. The base 145 has two tenons 146 and 147 with a hole 148 and 149 which engage in the two tapered holes 152 and 153. The ends of each of the tenons 146 and 147 is bent over the taper 154 and 155 of the holes 152 and 153 to provide the taper 150 and 151.

The attachment pin 7 has three semi-circular notches 117, 118, 119 in the edge of the connecting portion 20 which is part of the end 39 of the mobile support 9, each notch 117, 118, 119 receiving the free end 107, 108, 109 of the corresponding coil 101, 102, 103, said free end curving into the corresponding notch.

The embodiment shown in FIG. 15 relates to a modulatable energy absorbing device which is at the end 39 of the mobile support 9.

The device includes three coils 191, 192 and 193 which have a horizontal retention and a vertical attachment. The three coils 191, 192 and 193 are mounted on a roller 50 which is disposed around a substantially horizontal retaining pin 5. The retaining assembly of the coils can be similar to that shown in FIG. 3. Each coil 191, 192 and 193 has a corresponding rectilinear portion 194, 195 and 196 in substantially the same direction as the force to be damped and extended by a free end 197, 198 and 199 curved around an attachment pin 264, 265 and 266. Each attachment pin consists of a substantially vertical mobile holding rod 204, 205 and 206.

The mobile holding rods 204, 205 and 206 each have a pyrotechnic actuator 201, 202 and 203 which is fixed in the connecting portion 20 of the mobile support 9 by means of a threaded portion. The pyrotechnic actuators are disposed above the mobile support 9.

In the embodiment shown in FIG. 16, the pyrotechnic actuators 201, 202 and 203 are under the mobile support 9. The coils 191, 192 and 193 are disposed in the same manner as in FIG. 15.

The modulatable energy absorbing device shown in FIG. 17 includes three coils 211, 212 and 213 which have a vertical retention and a vertical attachment. The three coils 211, 212 and 213 are each mounted on a corresponding roller 214, 215 and 216 which is disposed around a corresponding substantially vertical retaining pin 207, 208 and 209. Each coil 211, 212 and 213 has a corresponding rectilinear part 194, 195 and 196 in substantially the same direction as the force to the damped and extended by a free end 197, 198 and 199 curved around an attachment pin 264, 265 and 266. Each attachment pin consists of a substantially vertical mobile holding rod 204, 205 and 206. The mobile holding rods 204, 205 and 206 each have a pyrotechnic actuator 201, 202 and 203 which is fixed into the connecting portion 20 of the mobile support 9 by means of a threaded portion. The pyrotechnic actuators are disposed under the mobile support 9; they can also be disposed on top, as in FIG. 15.

Figure 18:
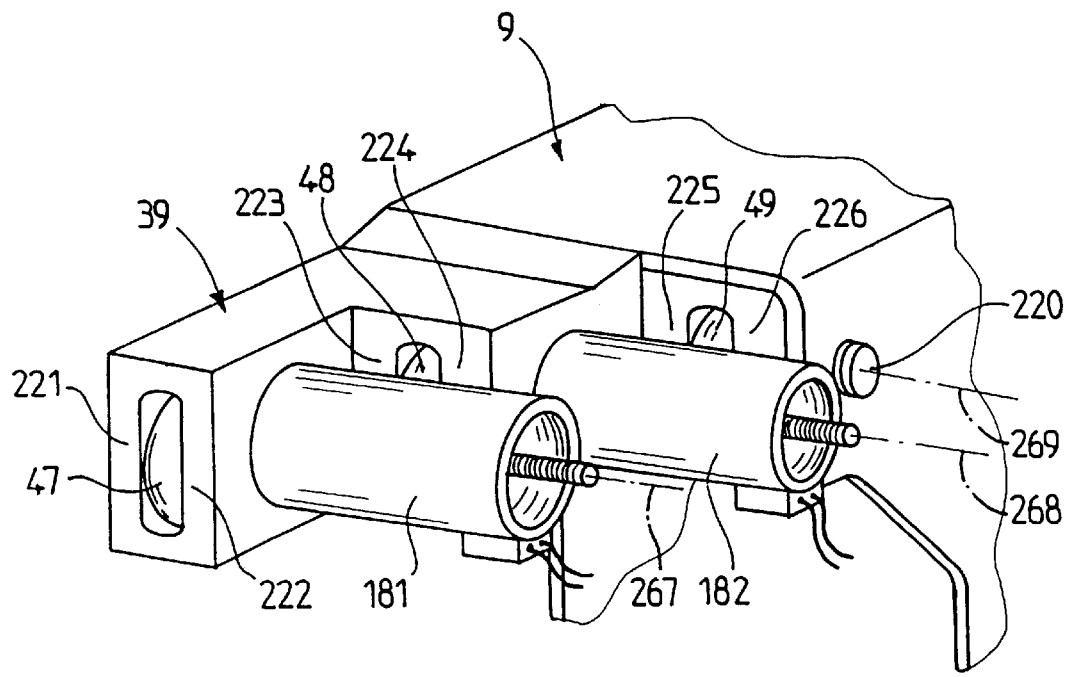
FIG. 18 is a perspective view of another embodiment of the retention and the attachment.
Figure 19:
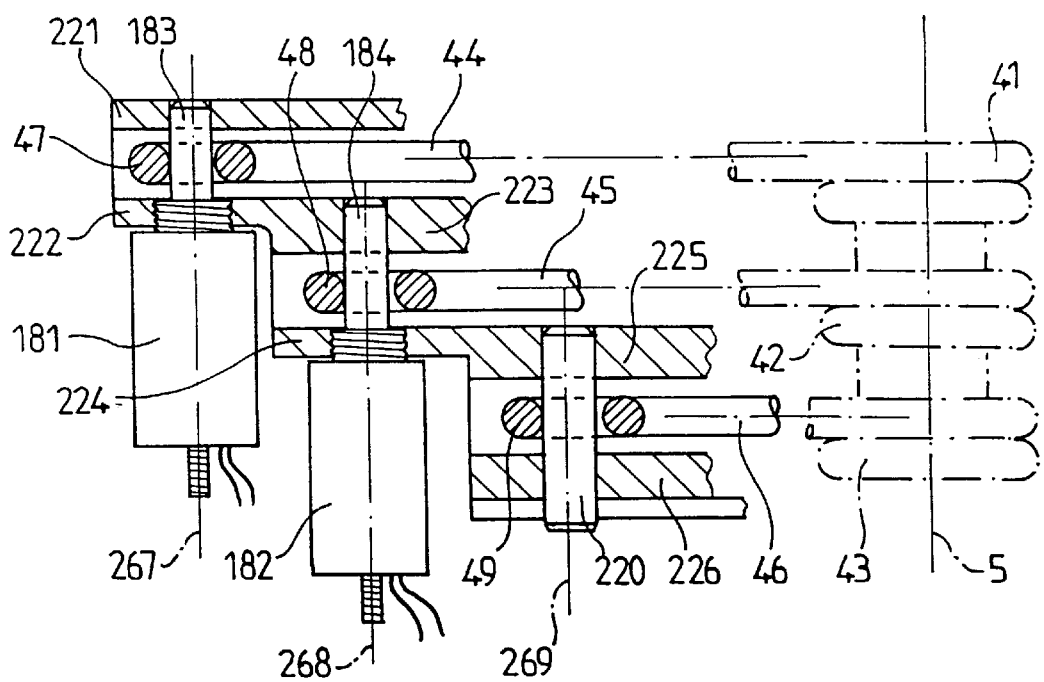
FIG. 19 is a plan view of FIG. 18, partly in section.

The embodiment shown in FIGS. 18 and 19 relates to a modulatable energy absorption device which is at the end 39 of the mobile support 9. The device includes three coils 41, 42 and 43 which have a horizontal retention and a vertical attachment. The three coils 41, 42 and 43 are mounted on a roller 50 which is disposed around a substantially horizontal retaining pin 5. The retaining assembly for the coils can be similar to that shown in FIG. 3. Each coil 41, 42 and 43 has a rectilinear portion 44, 45 and 46 in substantially the same direction as the force to be damped and extended by a free end 47, 48 and 49 curved around a substantially horizontal attachment pin 267, 268 and 269. An attachment pin 269 consists of a fixed holding rod 220 which is supported by two bearings 225 and 226. The other two attachment pins 267 and 268 each consist of a mobile holding rod 183 and 184 which is supported by two corresponding bearings 221, 222 and 223, 224. The mobile holding rods 183 and 184 each have a pyrotechnic actuator 181, 182 which is fixed to the wall of the corresponding bearing 222, 224.

Figure 20:
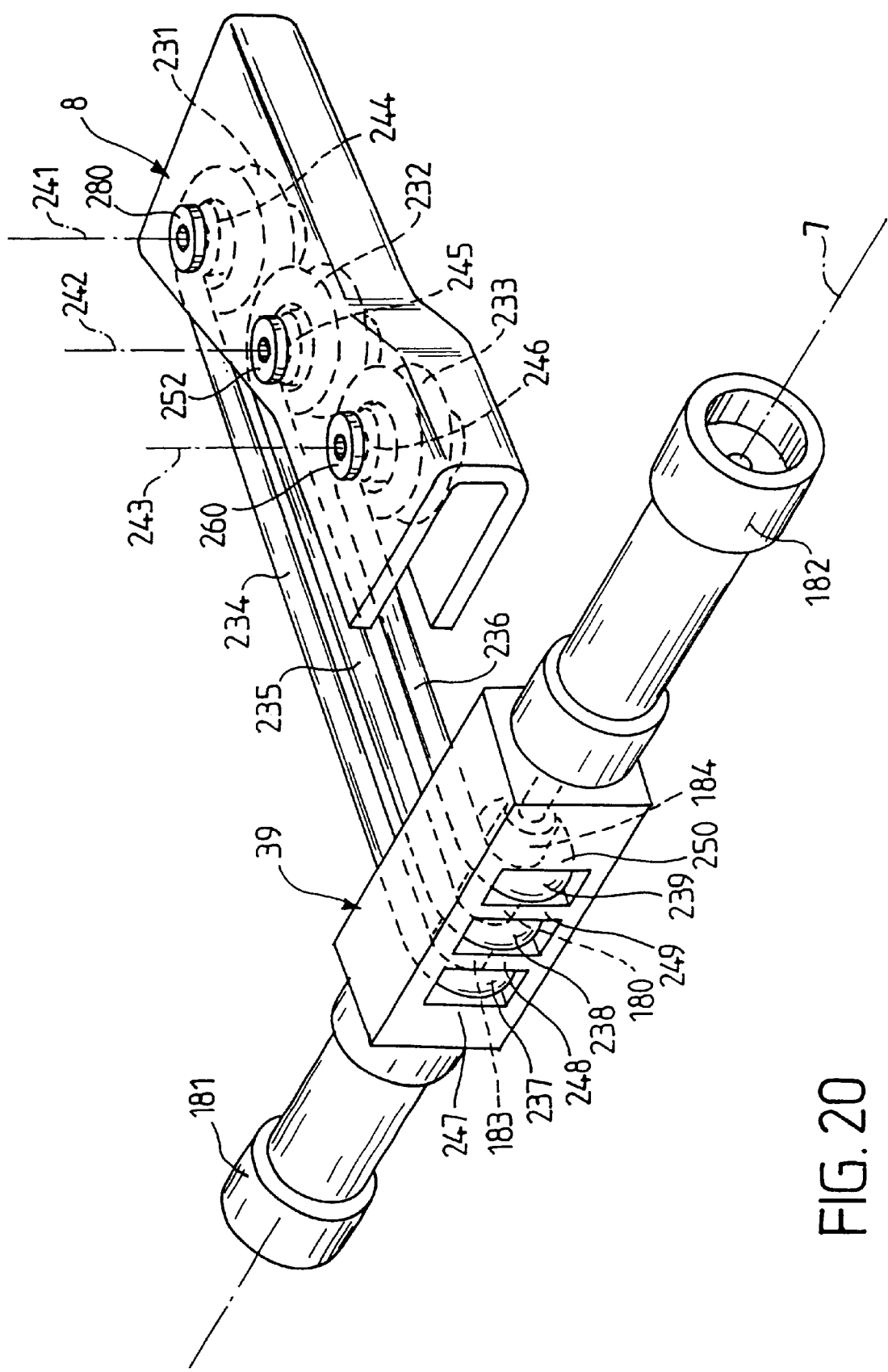
FIG. 20 is a perspective view of another embodiment of the retention and the attachment.

By combining the vertical retention of the coils shown in FIG. 20 and the horizontal attachment shown in FIGS. 18 and 19 another embodiment of the invention is obtained at the end 39 of the mobile support 9 and on another fixed support structure 8 which has a U-shaped section with an upper lateral portion and a lower lateral portion. Three coils 231, 232 and 233 are each mounted on a corresponding roller 244, 245 and 246 which is disposed around a corresponding substantially vertical retaining pin 241, 242 and 243. Each coil 231, 232 and 233 has a corresponding rectilinear portion 44, 45 and 46 in substantially the same direction as the force to be damped and extended by a free end 47, 48 and 49 curved around a substantially horizontal attachment pin 267, 268 and 269. An attachment pin 269 consists of a fixed holding rod 220 which is supported by two bearings 225 and 226. The other two attachment pins 267 and 268 each consist of a mobile holding rod 183, 184 which is supported by two bearings 221, 222 and 223, 224. The mobile holding rods 183 and 184 each have a pyrotechnic actuator 181, 182 which is fixed to the wall of the corresponding bearing 222, 224.

Figure 21:
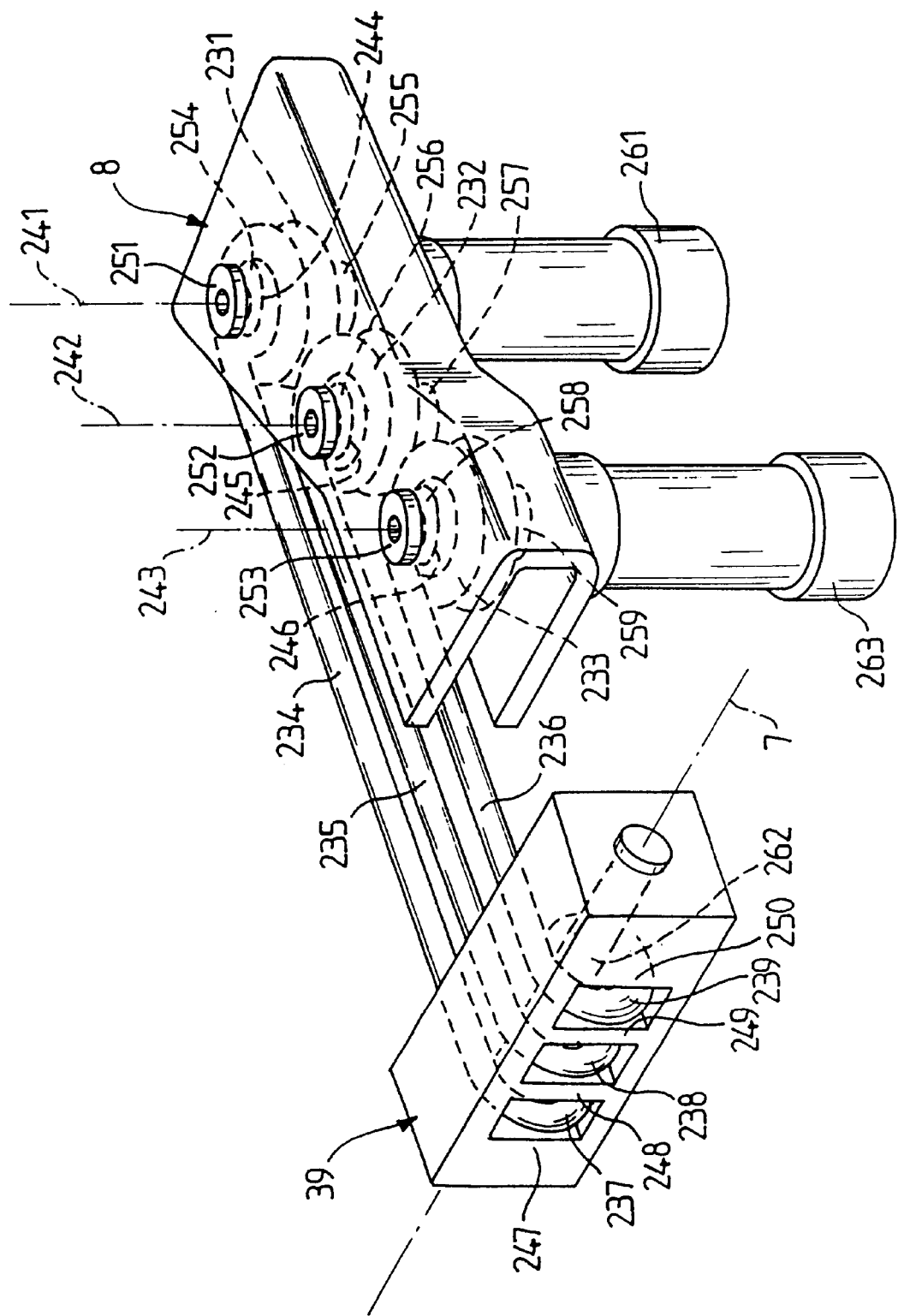
FIG. 21 is a perspective view of another embodiment of the retention and the attachment.
Figure 22:
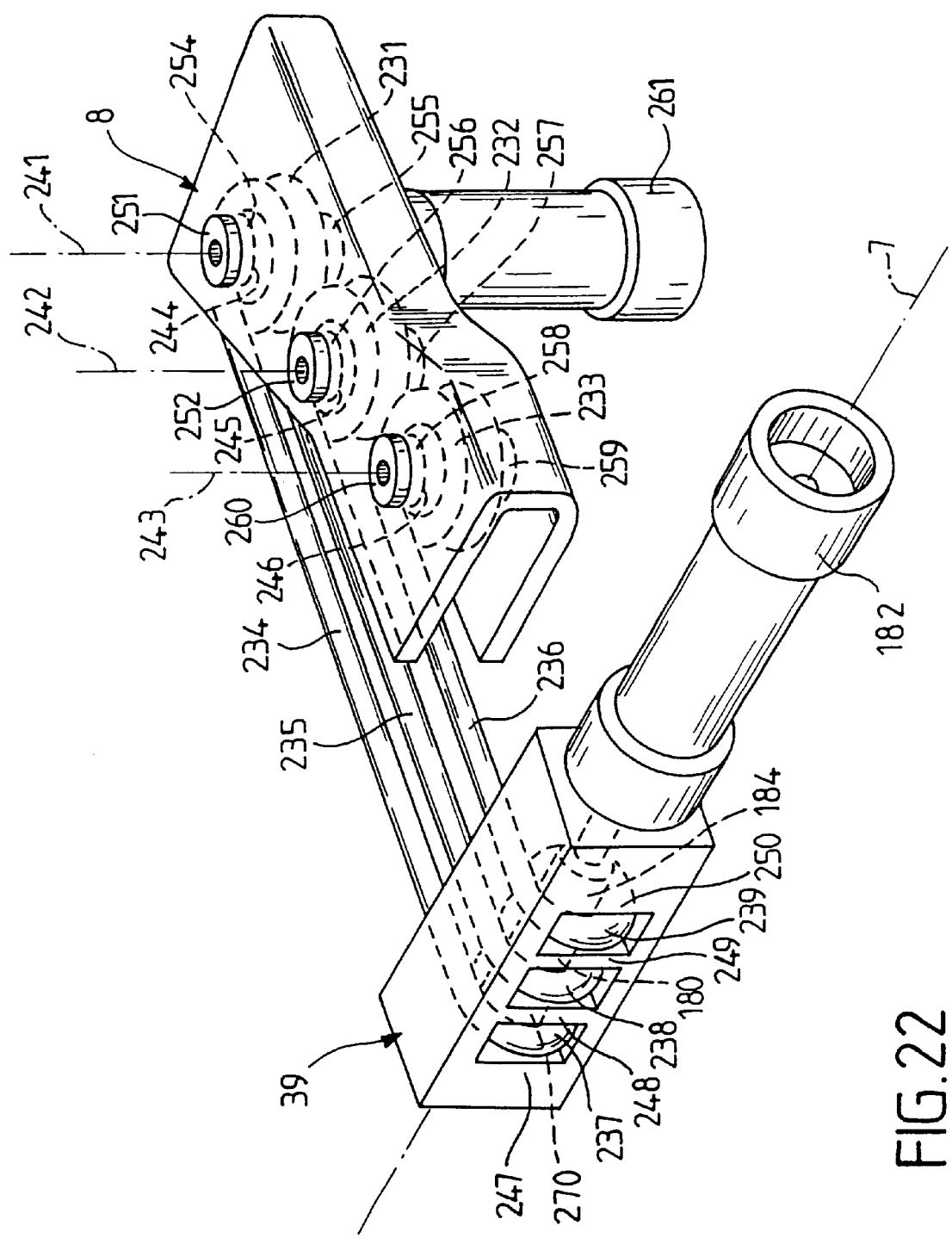
FIG. 22 is a perspective view of another embodiment of the retention and the attachment.

The embodiments shown in FIGS. 20, 21 and 22 relate to a modulatable energy absorbing device at the end 39 of the mobile support 9 and on the fixed support structure 8 which has a U-shaped section with an upper lateral portion and a lower lateral portion. The coils have a vertical retention and a horizontal attachment.

In the embodiment shown in FIG. 20, three coils 231, 232 and 233 are each mounted on a corresponding roller 244, 245 and 246 which is disposed around a corresponding substantially vertical retaining pin 241, 242 and 243. Each coil 231, 232 and 233 has a rectilinear portion 234, 235 and 236 in substantially the same direction as the force to be damped and extended by a free end 237, 238 and 239 curved around a single attachment pin 7 which is substantially horizontal. The central coil 232 is attached to a fixed holding rod 180 supported by two central bearings 248 and 249. Each lateral coil 231, 233 is attached to a corresponding mobile holding rod 183, 184 which is supported by a corresponding lateral bearing 247, 250 and by the corresponding central bearing 248, 249. The mobile holding rods 183 and 184 each have a pyrotechnic actuator 181, 182 which is fixed to the wall of the corresponding bearing 247, 250.

In the embodiment shown in FIG. 21, three coils 231, 232 and 233 are each mounted on a corresponding roller 244, 245 and 246 which is disposed around a corresponding substantially vertical retaining pin 241, 242 and 243. The central coil 232 is retained by a fixed holding rod 252 which is supported by two central bearings 256 and 257. Each lateral coil 231, 233 is retained by a corresponding mobile holding rod 251, 253 which is supported by two corresponding lateral bearings 254, 255 and 258, 259. Each coil 231, 232 and 233 has a corresponding rectilinear portion 234, 235 and 236 in substantially the same direction as the force to be damped and extended by a free end 237, 238 and 239 curved around a single attachment in 7 which is substantially horizontal. The attachment is to a fixed holding rod 262 which is supported by two central bearings 248 and 249 and by two lateral bearings 247 and 250. The mobile holding rods 251 and 253 each have a corresponding pyrotechnic actuator 261, 263 which is fixed under and to the lower lateral portion. There can also be fixed on top of and to the upper lateral portion. The central bearing 256 and the two lateral bearings 254 and 258 are in the upper lateral portion. The central bearing 257 and the two lateral bearings 255 and 259 are in the lower lateral portion.

In the embodiment shown in FIG. 22, three coils 231, 232 and 233 are each mounted on a corresponding roller 244, 245 and 246 which is disposed around a corresponding substantially vertical retaining pin 241, 242 and 243. The central coil 232 is retained by a fixed holding rod 252 which is supported by two central bearings 256 and 257. The first lateral coil 231 is retained by a mobile holding rod 251 which is supported by the two lateral bearings 254 and 255. The second lateral coil 233 is retained by a fixed holding rod 260 which is supported by two lateral bearings 258 and 259. Each coil 231, 232 and 233 has a rectilinear portion 234, 235 and 236 in substantially the same direction as the force to be damped and extended by a free end 237, 238 and 239 curved around a single substantially horizontal attachment pin 7. The central coil 232 is attached to a fixed holding rod 180 which is supported by two central bearings 248 and 249. The first lateral coil 231 is attached to a fixed holding rod 270 which is supported by a corresponding lateral bearing 247 and by the corresponding central bearing 248. The second lateral coil 233 is attached to a mobile holding rod 184 which is supported by a corresponding lateral bearing 250 and by the corresponding central bearing 249. The mobile holding rods 184 and 251 each have a pyrotechnic actuator 182, 261.

In the embodiments shown in FIGS. 18 to 22 the three coils 41, 42, 43, etc. have different lengths rectilinear parts 44, 45, 46, etc. with retaining pins or attachment pins, as appropriate, which are axially offset relative to each other in the direction of movement of the mobile support 9. The different lengths of the coils provide additional modulation of energy absorption in the event of an impact.

Another way to modulate the absorption of energy is to modify the sections of the wires constituting the coils. The energy absorbed is matched optimally to the characteristics of the impact suffered by choosing the number of coils used to absorb the impact and the coil lengths used.

One advantage of the pyrotechnic actuators which are used to determine the number and/or the length of the coils used to absorb the energy of the impact is their short response time. In the event of an impact, at least one pyrotechnic actuator may be triggered for almost instantaneously displacing a holding rod and releasing a coil which does not participate in absorbing the energy of the impact.

What is claimed is:

1. A modulatable device for absorbing energy from an automobile vehicle steering column, which includes a steering shaft rotatably mounted in a body-tube connected to a support assembly fixed to the vehicle, said modulatable device comprising:

a fixed support fastened to the vehicle and a mobile support which is connected to and locked to the fixed support with a particular clamping force such that locking ceases in the event of an impact;

at least two coils of a metal member with a particular section, which are connected to the fixed support and to the mobile support by a retaining pin and by an attachment pin, respectively;

the coils being mounted on one or more rollers disposed on the retaining pin fastened to the fixed support member and each having a rectilinear portion substantially parallel to the direction of movement of the mobile support on the fixed support to be damped, and a free end which is attached to the corresponding attachment pin disposed at one end of the mobile support, at the same end as the steering rack;

at least one coil having one of its attachment pin and its retaining pin in the form of a holding rod adapted to be moved along its axis by pyrotechnic displacement means which are actuated by actuator means, so that in the event of an impact the mobile support is connected to the fixed support by a number of coils matching the energy to be absorbed.

2. The device claimed in claim 1 wherein the attachment pin of at least one coil is a holding rod movable along its axis by pyrotechnic displacement means.

3. The device claimed in claim 1 wherein the retaining pin of at least one coil is a holding rod movable along its axis by pyrotechnic displacement means.

4. The device claimed in claim 1 wherein:

the attachment pin of at least one coil is a holding rod movable along its axis by pyrotechnic displacement means; and the retaining pin of at least one coil is a holding rod movable along its axis by pyrotechnic displacement means.

5. The device claimed in claim 1 wherein said movable holding rod is substantially horizontal.

6. The device claimed in claim 1 wherein said movable holding rod is substantially vertical.

7. The device claimed in claim 4 wherein:

the attachment pin of at least one coil is a movable holding rod which is substantially horizontal; and the retaining pin of at least one coil is a movable holding rod which is substantially horizontal.

8. The device claimed in claim 4 wherein:

the attachment pin of at least one coil is a movable holding rod which is substantially vertical; and the retaining pin of at least one coil is a movable holding rod which is substantially vertical.

9. The device claimed in claim 4 wherein:

the attachment pin of at least one coil is a movable holding rod which is substantially horizontal; and the retaining pin of at least one coil is a movable holding rod which is substantially vertical.

10. The device claimed in claim 4 wherein:

the attachment pin of at least one coil is a movable holding rod which is substantially vertical; and the retaining pin of at least one coil is a movable holding rod which is substantially horizontal.

11. The device claimed in claim 1 wherein three coils are mounted on a roller disposed around a retaining pin and are attached to movable holding rods having corresponding pyrotechnic actuators which are substantially vertical.

12. The device claimed in claim 1 wherein three coils are mounted on a roller disposed around a retaining pin, one of them is attached to a fixed holding rod supported by two bearings, and the other two coil are attached to corresponding movable holding rods supported by two bearings and each having a pyrotechnic actuator.

13. The device claimed in claim 1 wherein three coils are each mounted on a corresponding roller disposed around a retaining pin, one of the coils is attached to a fixed holding rod supported by two bearings, and the other coils are each attached to corresponding movable holding rods supported by two bearings and each having a pyrotechnic actuator.

14. The device claimed in claim 13, wherein the coil attached to a fixed holding rod is a central coil.

15. The device claimed in claim 1, wherein three coils are each mounted on a corresponding roller disposed around a corresponding substantially vertical retaining pin, a central one of the coils being retained by a fixed holding rod supported by two central bearings, and the other coils being retained by a movable holding rod supported by two corresponding lateral bearings and having a corresponding pyrotechnic actuator, the three coils being attached to a single attachment pin consisting of a fixed holding rod supported by two central bearings and two lateral bearings.

16. The device claimed in claim 1 wherein:

the fixed support includes a base with two substantially vertical lugs between which the mobile support is engaged, each of the lugs having a hole in it through which the retaining pin passes;

the mobile support has two substantially vertical lateral parts and a connecting portion; and each of the lateral parts has an oblong hole in its upper part through which the retaining pin passes and the oblong hole has a length corresponding to the energy absorption travel.

17. The device claimed in claim 16 wherein the retaining pin is a rod with a sleeve, said sleeve is disposed between the two lateral parts of the mobile support, said rod is held at each of its two ends by a fixing assembly in the corresponding lug of the fixed support and by a sliding assembly of the mobile support; each fixing assembly is locked onto each of the lugs with a particular force.

18. The device claimed in claim 17 wherein:

each fixing assembly includes a clamping washer disposed between the sleeve and the corresponding lug of the fixed support, said clamping washer including a tube passing through the oblong hole in the corresponding lateral part of the mobile support; and a corresponding threaded end of the rod passes through the tube of the clamping washer and the hole through the corresponding lug to receive a clamping nut, which is applied to said lug in order to lock the fixing assembly at a particular value.

19. The device claimed in claim 18 wherein:

each sliding assembly includes an external washer with a square protuberance and an internal washer with a square hole which receives said square protuberance;

said square protuberance has a hole in it through which the tube of the clamping washer passes;

the external washer is disposed between the corresponding lug of the fixed support and the corresponding lateral part of the support;

the internal washer is disposed between said lateral part and the clamping washer;

the square protuberance passes through and slides in the corresponding oblong hole of the mobile support.

20. The device claimed in claim 17, wherein the rod has one of its two ends threaded and the other end consists of a head applied to the corresponding lug of the fixed support.

21. The device claimed in claim 16 wherein:

the attachment pin consists of a central fixed holding rod and of two lateral movable holding rods, each of which has a pyrotechnic actuator, which is disposed on and fixed to the corresponding external bearing face of the mobile support;

the lateral mobile holding rods pass through a corresponding hole in each of the lateral parts of the mobile support, and are supported by corresponding bearings which are part of a bracket mounted on and fixed to the connecting portion of the end of the mobile support;

the central fixed holding rod is supported by the two bearings;

a closure member of the bracket surrounds the end of the mobile support, the bracket and the free ends of the coils, said closure member being assembled to the mobile support and the bracket.

22. The device claimed in claim 16 wherein:

the retaining pin consists of a central fixed holding rod and two lateral movable holding rods, each of which has a pyrotechnic actuator;

two rollers are mounted on a thin tube in which the lateral movable holding rods slide, and a roller is mounted on the central fixed holding rod, which is mounted on the thin tube.

23. The device claimed in claim 22 wherein:

each of the two lateral movable holding rods has a pyrotechnic actuator disposed on and fixed to the external face of the corresponding lug of the fixed support;

the retaining pin has at each end a fixing assembly in the corresponding lug of the fixed support and a sliding assembly of the corresponding lateral part of the mobile support, each fixing assembly being locked to each of the lugs with a particular clamping force;

each of the movable lateral holding rods passes through or engages in the corresponding fixing assembly.

24. The device claimed in claim 23 wherein:

each fixing assembly includes a metal tube which passes through the oblong hole in the corresponding lateral part of the mobile support and which passes through the hole through the corresponding lug;

an internal taper is provided at the same end as said lateral part and an external taper is provided at the same end as said lug in order to lock the fixing assembly.

25. The device claimed in claim 24 wherein:

each sliding assembly includes an external washer with a square half-protuberance and a hole through it, and an internal washer with a square half-protuberance and a hole through it, each half-protuberance nesting in the other washer by means of tenons entering the holes to form a square protuberance;

the external washer is disposed between the corresponding lug of the fixed support and the corresponding lateral part of the mobile support;

the internal washer is disposed between said lateral part and the internal taper of the metal tube;

the square protuberance passes through and slides in the corresponding oblong hole in the lateral part of the mobile support.

26. The device claimed in claim 25, wherein the tube is supported by four bearings which form part of a bracket mounted on and fixed under the base of the fixed support.

27. The device claimed in claim 22, wherein the attachment pin includes three semi-circular notches at the edge of the connecting portion which forms part of the end of the mobile support, each notch receiving a free end of one of the said coils.

* * * * *